(12) United States Patent
Squillace

(10) Patent No.: US 9,529,648 B2
(45) Date of Patent: Dec. 27, 2016

(54) GENERIC DECLARATION OF BINDINGS BETWEEN EVENTS AND EVENT HANDLERS REGARDLESS OF RUNTIME STRUCTURE

(75) Inventor: Michael A. Squillace, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2154 days.

(21) Appl. No.: 12/492,485

(22) Filed: Jun. 26, 2009

(65) Prior Publication Data

US 2010/0332968 A1    Dec. 30, 2010

(51) Int. Cl.
*G06F 9/00* (2006.01)
*G06F 9/54* (2006.01)

(52) U.S. Cl.
CPC .................... *G06F 9/542* (2013.01)

(58) Field of Classification Search
CPC ....................................... G06F 9/542
USPC ........................ 715/207, 234, 762
See application file for complete search history.

(56) References Cited

U.S. PATENT DOCUMENTS

| | | | |
|---|---|---|---|
| 5,625,821 A * | 4/1997 | Record et al. ............... | 718/100 |
| 5,706,505 A * | 1/1998 | Fraley et al. | |
| 5,828,882 A * | 10/1998 | Hinckley ..................... | 719/318 |
| 6,003,023 A * | 12/1999 | Schmidt | |
| 6,083,276 A * | 7/2000 | Davidson et al. ........... | 717/107 |
| 6,732,364 B1 | 5/2004 | Bhaskaran et al. | |
| 6,772,408 B1 * | 8/2004 | Velonis et al. .............. | 717/100 |
| 7,451,392 B1 * | 11/2008 | Chalecki et al. ........... | 715/234 |
| 7,620,903 B1 * | 11/2009 | Rasmussen et al. ........ | 715/762 |
| 7,904,194 B2 * | 3/2011 | Brown et al. ............... | 700/174 |
| 2002/0003547 A1 * | 1/2002 | Wang et al. ................. | 345/727 |
| 2003/0137539 A1 * | 7/2003 | Dees ........................... | 345/762 |
| 2004/0056894 A1 | 3/2004 | Zaika et al. | |
| 2004/0172627 A1 | 9/2004 | Ramani | |
| 2004/0230896 A1 * | 11/2004 | Elza et al. .................. | 715/511 |
| 2004/0230911 A1 * | 11/2004 | Bent et al. .................. | 715/762 |
| 2005/0055631 A1 * | 3/2005 | Scardina et al. ........... | 715/513 |
| 2005/0188349 A1 * | 8/2005 | Bent et al. .................. | 717/106 |
| 2005/0273758 A1 * | 12/2005 | Long .......................... | 717/101 |
| 2006/0026505 A1 * | 2/2006 | Mani et al. ................. | 715/513 |
| 2006/0026555 A1 * | 2/2006 | Feigenbaum et al. ...... | 717/104 |
| 2006/0047665 A1 * | 3/2006 | Neil ............................ | 707/10 |

(Continued)

FOREIGN PATENT DOCUMENTS

WO    WO 02/25431 A2    3/2002

*Primary Examiner* — Stephen Hong
*Assistant Examiner* — Marshon Robinson
(74) *Attorney, Agent, or Firm* — Stephen J. Walder, Jr.; William J. Stock

(57) ABSTRACT

Mechanisms for binding an event handler with an event in association with a component of a hierarchical structure are provided. The mechanisms receive a structure document specifying an event, an event handler, and a binding of the event handler with the event. The mechanisms further associate the event and event handler with one or more nodes of a hierarchical model of the hierarchical structure stored in a storage device of the data processing system. Moreover, the mechanisms bind the event handler with the event for the one or more nodes in accordance with the hierarchical model. In addition, the mechanisms generate one or more objects for implementing the hierarchical structure in a framework corresponding to the hierarchical model. The structure document specifies the event binding of the event handler with the event type in a declarative manner.

20 Claims, 5 Drawing Sheets

(56) References Cited

U.S. PATENT DOCUMENTS

| | | |
|---|---|---|
| 2006/0224948 A1* | 10/2006 | Desmond et al. ............ 715/507 |
| 2007/0130205 A1* | 6/2007 | Dengler et al. ............ 707/104.1 |
| 2007/0136658 A1 | 6/2007 | Feigenbaum et al. |
| 2008/0021990 A1* | 1/2008 | Mansilla ...................... 709/223 |
| 2008/0163080 A1* | 7/2008 | Kooy et al. ................... 715/762 |
| 2008/0168430 A1* | 7/2008 | Browne et al. ............... 717/137 |
| 2008/0216052 A1* | 9/2008 | Hejlsberg et al. ............ 717/114 |
| 2008/0238618 A1* | 10/2008 | Goteti et al. ................ 340/10.1 |

* cited by examiner

GENERIC DECLARATION OF BINDINGS BETWEEN EVENTS AND EVENT HANDLERS REGARDLESS OF RUNTIME STRUCTURE

BACKGROUND

The present application relates generally to an improved data processing apparatus and method and more specifically to mechanisms for providing a generic declaration of bindings between events and event handlers that operates regardless of the underlying runtime structure in which events are occurring.

Nearly any modern architecture for building a graphical user interface (GUI) includes an event subsystem. The event subsystem is responsible for managing the events that occur, i.e. are "fired," either by the GUI runtime environment or due to user interaction with the GUI. An event may be a key press, mouse click, a GUI component receiving focus, the text in a text field becoming invalid due to a user entering additional text, or the like.

Most GUI frameworks also allow GUI developers to bind an action to be performed to a particular type of event that is fired by a specific event target, i.e. the control that is rendered as a result of the declaration of a GUI component. The specification of the action that is to be performed upon the firing of an event is called the event handler and the act of binding the event handler to an event is often implemented as code that registers or adds a listener to the event subsystem. The listener, in object-oriented programming, is an object that receives the event and processes it appropriately. In order for a listener to receive events, the listener must be registered as an event listener on the event source object and it must implement an appropriate interface.

FIG. 1 illustrates the relationship between an event source and an event listener using a JavaScript example. As shown in FIG. 1, an event source 110, e.g., a GUI component or element, has a corresponding registered event listener 120, which may be registered with the event source 110 by a client or other object. The event listener 120 operates as an event listener for a particular type of event that may be fired by the event source 110. When an event occurs, the runtime environment 130 first determines the event source 110 and type of the event. If an event listener 120 is registered with the event source for this type of event, an event object 140 is generated. Then, for each registered event listener 120 for this type of event, the runtime environment 130 invokes an appropriate event handling method of the event listener 120 and passes the event object 140 to the event handling method as a parameter.

In the HyperText Markup Language (HTML), events are bound to certain elements via a predefined set of attributes on the elements that declare the creation of the GUI component. Here, the event is given by an attribute, the event target is the element to which the attribute is attached, or more precisely, the control that is rendered as the result of the declaration of the element, and the event handler is usually a block of JavaScript code that is performed when the event is fired. For more information regarding events and event handling in HTML, reference is made to the HTML 4.01 specification available at the WorldWide Web (W3) Consortium website.

The following is an example of Java Swing™ code (an Application Programming Interface for providing a graphical user interface for Java programs) for implementing an event handler that itself implements an event listener:

```
public class ExampleClass implements ActionListener {
    ...
    JButton button = new JButton("Example Button!");
    button.addActionListener(this);
    ...
    public void actionPerformed(ActionEvent e) { numClicks++;
    label.setText(labelPrefix + numClicks);
    }
}
```

With this example in mind, it should be noted that the event listener has three important portions. First, the event listener has a declaration of the event handler class and specifies whether the event handler class implements a listener interface or extends a class that implements a listener interface. In this example, the declaration is "public class ExampleClass implements ActionListener {". Second, the event handler has a portion of code, referred to herein as the registration code, that registers an instance of the event handler class as a listener of one or more GUI components or elements so that the event handle may be registered as an event listener. In this example, the registration code is "button.addActionListener(this)". Third, the event handler has a portion of code, referred to herein as the implementation code, that implements the methods in the listener interface. In this example, the implementation code is "public void actionPerformed(ActionEvent e) {numClicks++; label.setText(labelPrefix+numClicks);}".

There are three main problems with the approach of registering event handlers and listeners with event sources in HTML in the manner generally known in the prior art. First, the types of events that can be observed are limited by HTML itself. If new events are to be observed, the HTML itself must be restated. Second, the event handler must take a specific form, usually script code in a specified file on the client computing device or server computing device, or within the document itself. Third, HTML presupposes a particular type of runtime structure. Namely, HTML presupposes a document object model (DOM) rendered inside a web browser or similar user agent.

Another example of declarative markup language for specifying renderable structures is XForms (a description of which may also be found at the W3 Consortium website) which uses the Extensible Markup Language (XML) Events specification to declare its event bindings. In XML Events, no assumption is made about the event types that can be observed except that the event type must be a legal XML name. In addition, the specification of an event handler is more generic since its value must only satisfy the criterion that it is a Uniform Resource Identifier (URI). Nonetheless, this language is still limited because the event handler cannot be specified as a Java class or executable on the client computer. That is, the language itself simply does not have syntax for this type of specification. Moreover, the XML Events specification still suffers in that it is tied to a particular runtime structure and presupposes a DOM as understood by the DOM Level 2 specification.

SUMMARY

In one illustrative embodiment, a method, in a data processing system, is provided for binding an event handler with an event in association with a component of a hierarchical structure. The method comprises receiving, in a processor of the data processing system, a structure document specifying an event, an event handler, and a binding of the event handler with the event. The method further comprises associating, by the processor, the event and event handler with one or more nodes of a hierarchical model of the hierarchical structure stored in a storage device of the data processing system. Moreover, the method comprises binding, by the processor, the event handler with the event for the one or more nodes in accordance with the hierarchical model. In addition, the method comprises generating, by the processor, one or more objects for implementing the hierarchical structure in a framework corresponding to the hierarchical model. The structure document specifies the event binding of the event handler with the event type in a declarative manner.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
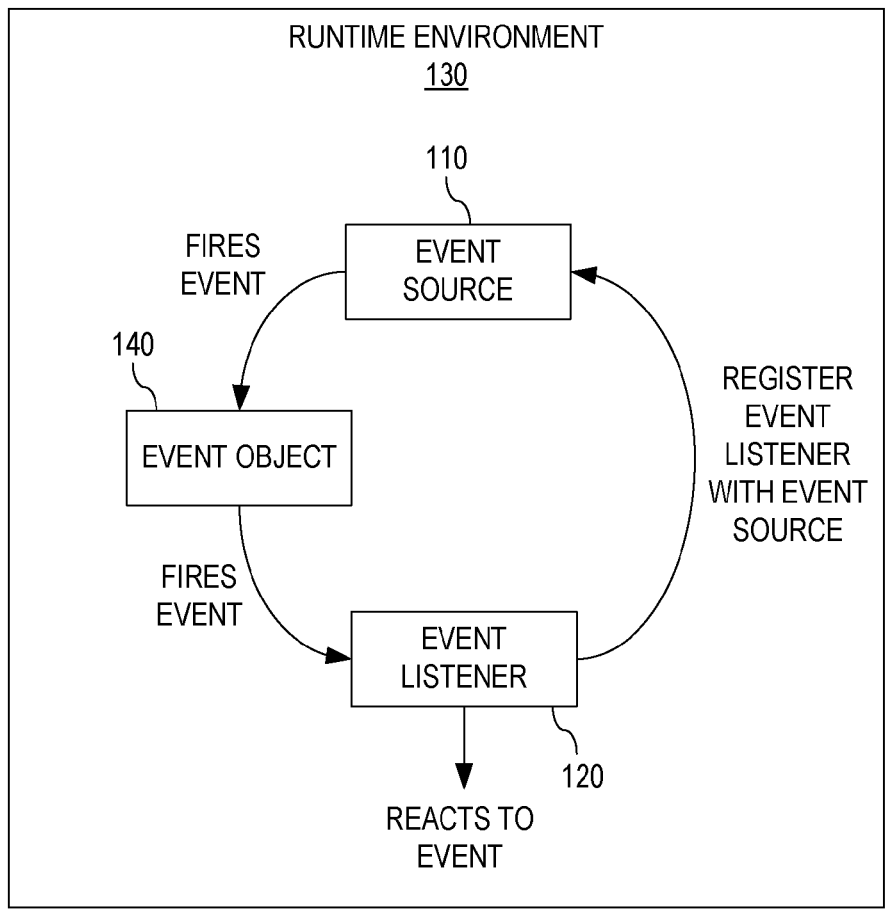
FIG. 1 is an example diagram illustrating the relationship between an event source and an event listener.

The illustrative embodiments provide a mechanism for providing a generic declaration of bindings between event types and event handlers that operates regardless of the underlying runtime structure in which events are occurring. The mechanisms of the illustrative embodiments permit a flexible method for specifying the different aspects of event bindings including an event observer, an event target, an event type, and an event handler. With the mechanisms of the illustrative embodiments, the underlying event binding system, which processes the event binding declarations and injects them into the runtime environment, can handle the details of achieving the actual binding without the markup language itself referring to any aspect of the runtime environment or its event subsystem. Moreover, with the mechanisms of the illustrative embodiments, there are no restrictions on the types of events that can be targeted, the event targets themselves, or the event handlers that are bound to these events. In addition, because the event bindings are declarative, they can be used in a variety of applications to handle a variety of events and event handlers. By "declarative" what is meant is that the generic declaration of bindings between event types and event handlers is done by expressing the logic of an operation without describing its control flow, i.e. describing what the operation should accomplish rather than how to go about accomplishing the operation. This is in contrast to an imperative definition of event bindings that requires a detailed description of how exactly to perform the event bindings, which is specific to the underlying runtime structure, as is used in prior art mechanisms.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In addition, the program code may be embodied on a computer readable storage medium on the server or the remote computer and downloaded over a network to a computer readable storage medium of the remote computer or the users' computer for storage and/or execution. Moreover, any of the computing systems or data processing systems may store the program code in a computer readable storage medium after having downloaded the program code over a network from a remote computing system or data processing system.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The illustrative embodiments may be utilized in many different types of data processing environments including a distributed data processing environment, a single data processing device, or the like. In order to provide a context for the description of the specific elements and functionality of the illustrative embodiments, FIGS. 2 and 3 are provided hereafter as example environments in which aspects of the illustrative embodiments may be implemented.

Figure 2:
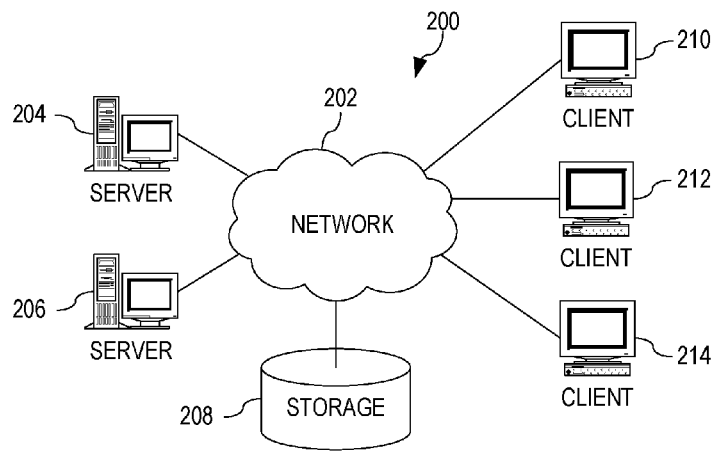
FIG. 2 is a pictorial representation of an example distributed data processing system in which aspects of the illustrative embodiments may be implemented.
Figure 3:
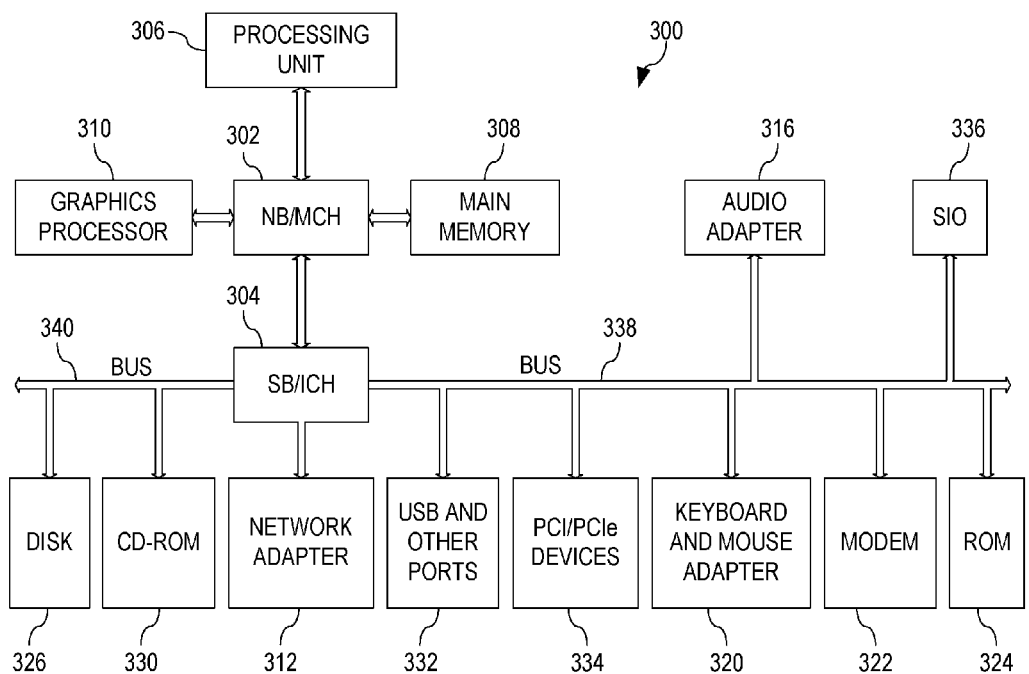
FIG. 3 is a block diagram of an example data processing device in which aspects of the illustrative embodiments may be implemented.

With reference now to the figures and in particular with reference to FIGS. 2-3, example diagrams of data processing environments are provided in which illustrative embodiments of the present invention may be implemented. It should be appreciated that FIGS. 2-3 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 2 depicts a pictorial representation of an example distributed data processing system in which aspects of the illustrative embodiments may be implemented. Distributed data processing system 200 may include a network of computers in which aspects of the illustrative embodiments may be implemented. The distributed data processing system 200 contains at least one network 202, which is the medium used to provide communication links between various devices and computers connected together within distributed data processing system 200. The network 202 may include connections, such as wire, wireless communication links, or fiber optic cables.

In the depicted example, server 204 and server 206 are connected to network 202 along with storage unit 208. In addition, clients 210, 212, and 214 are also connected to network 202. These clients 210, 212, and 214 may be, for example, personal computers, network computers, or the like. In the depicted example, server 204 provides data, such as boot files, operating system images, and applications to the clients 210, 212, and 214. Clients 210, 212, and 214 are clients to server 204 in the depicted example. Distributed data processing system 200 may include additional servers, clients, and other devices not shown.

In the depicted example, distributed data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 200 may also be implemented to include a number of different types of networks, such as for example, an intranet, a local area network (LAN), a wide area network (WAN), or the like. As stated above, FIG. 2 is intended as an example, not as an architectural limitation for different embodiments of the present invention, and therefore, the particular elements shown in FIG. 2 should not be considered limiting with regard to the environments in which the illustrative embodiments of the present invention may be implemented.

With reference now to FIG. 3, a block diagram of an example data processing device is shown in which aspects of the illustrative embodiments may be implemented. Data processing device 300 is an example of a computer, such as client 210 or server computer 204 or 206 in FIG. 2, in which computer usable code or instructions implementing the processes for illustrative embodiments of the present invention may be located.

In the depicted example, data processing device 300 employs a hub architecture including north bridge and memory controller hub (NB/MCH) 302 and south bridge and input/output (I/O) controller hub (SB/ICH) 304. Processing unit 306, main memory 308, and graphics processor 310 are connected to NB/MCH 302. Graphics processor 310 may be connected to NB/MCH 302 through an accelerated graphics port (AGP).

In the depicted example, local area network (LAN) adapter 312 connects to SB/ICH 304. Audio adapter 316, keyboard and mouse adapter 320, modem 322, read only memory (ROM) 324, hard disk drive (HDD) 326, CD-ROM drive 330, universal serial bus (USB) ports and other communication ports 332, and PCI/PCIe devices 334 connect to SB/ICH 304 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash basic input/output system (BIOS).

HDD 326 and CD-ROM drive 330 connect to SB/ICH 304 through bus 340. HDD 326 and CD-ROM drive 330 may use, for example, an integrated drive electronics (IDE) or serial advanced technology attachment (SATA) interface. Super I/O (SIO) device 336 may be connected to SB/ICH 304.

An operating system runs on processing unit 306. The operating system coordinates and provides control of various components within the data processing device 300 in FIG. 3. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing device 300 (Java is a trademark of Sun Microsystems, Inc. in the United States, other countries, or both).

As a server, data processing device 300 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing device 300 may be a symmetric multiprocessor (SMP) system including a plurality of processors in processing unit 306. Alternatively, a single processor system may be employed.

Instructions for the operating system, the object-oriented programming system, and applications or programs are located on storage devices, such as HDD 326, and may be loaded into main memory 308 for execution by processing unit 306. The processes for illustrative embodiments of the present invention may be performed by processing unit 306 using computer usable program code, which may be located in a memory such as, for example, main memory 308, ROM 324, or in one or more peripheral devices 326 and 330, for example.

A bus system, such as bus 338 or bus 340 as shown in FIG. 3, may be comprised of one or more buses. Of course, the bus system may be implemented using any type of communication fabric or architecture that provides for a transfer of data between different components or devices attached to the fabric or architecture. A communication unit, such as modem 322 or network adapter 312 of FIG. 3, may include one or more devices used to transmit and receive data. A memory may be, for example, main memory 308, ROM 324, or a cache such as found in NB/MCH 302 in FIG. 3.

Those of ordinary skill in the art will appreciate that the hardware in FIGS. 2-3 may vary depending on the implementation. Other internal hardware or peripheral devices, such as flash memory, equivalent non-volatile memory, or optical disk drives and the like, may be used in addition to or in place of the hardware depicted in FIGS. 2-3. Also, the processes of the illustrative embodiments may be applied to a multiprocessor data processing system, other than the SMP system mentioned previously, without departing from the spirit and scope of the present invention.

Moreover, the data processing device 300 may take the form of any of a number of different data processing systems including client computing devices, server computing devices, a tablet computer, laptop computer, telephone or other communication device, a personal digital assistant (PDA), or the like. In some illustrative examples, data processing device 300 may be a portable computing device which is configured with flash memory to provide non-volatile memory for storing operating system files and/or user-generated data, for example. Essentially, data processing device 300 may be any known or later developed data processing system without architectural limitation.

As mentioned above, the mechanisms of the illustrative embodiments may be implemented in one or more of the data processing systems and environments illustrated above in FIGS. 2-3 or other types of data processing systems and environments generally known in the art or later developed. The mechanisms of the illustrative embodiments provide an ability to generally declare event types and event handler bindings for graphical user interfaces (GUIs), or other types of hierarchical structures that use events and event handlers. The mechanisms use a declarative approach to defining the event handler bindings that is independent of the underlying runtime environment, e.g., an underlying browser, Java Runtime Environment (JRE), or the like. With the mechanisms of the illustrative embodiments, event types and event handlers may be defined in any desired programming language and, through the mechanisms of the illustrative embodiments, may be output as event types and event handler objects having bindings utilized by the runtime environment or framework in which the hierarchical structure is to be implemented. This allows hierarchical structures, such as GUIs, programmed in any of XML, HTML, Java Swing™, or the like, to be input to the mechanisms of the illustrative embodiments, and resulting event handlers and their bindings may be generated in any of the programming languages, e.g., XML, HTML, Java Swing™, or the like, depending upon the programming language used by the particular runtime environment or framework.

With the mechanisms of the illustrative embodiments, a hierarchical structure, such as a graphical user interface (GUI), is defined in terms of a model having a predetermined representation. In some illustrative embodiments, the model may be defined in terms of a structured document, such as an XML structured document, for example. In other example illustrative embodiments, the model may be defined, in terms of a directed acyclic graph (DAG), as an implementation of several Java™ interfaces. A model for the hierarchical structure may be provided for each of the runtime environments, frameworks, or the like, that are supported by the mechanisms of the illustrative embodiments. Thus, there may be different DAGs defined for different runtime environments, frameworks, or the like. For example, a first model may be defined for implementing the hierarchical structure in a framework that utilizes HTML and a second model may be defined for implementing the hierarchical structure in a framework that utilizes Java Swing™.

The predetermined representation further has an associated node naming mechanism that is used to correlate node identifiers with implementations of corresponding event types, event handlers, and their bindings in a desired programming language for a target runtime environment or framework. In other words, using the model for the target framework and the associated node naming mechanism, an input structure document's components may be converted or translated into corresponding output components for the particular runtime environments or frameworks that are supported by the implementation of the illustrative embodiments. The actual event handlers may be specified in the input structure document in any programming language since the correlation is performed on a model basis using a node naming methodology for the target runtime environment or framework.

Thus, the event types and event handlers of an input structure document, defining a hierarchical structure to be rendered in a particular runtime environment or framework, may be processed in accordance with this model to generate appropriate event types and event handler bindings in programming languages specific to the target runtime environments or frameworks in which the input structure document is implemented, regardless of the particular programming language used to define the input structure document. This in effect allows hierarchical structures to be defined in any programming language and allows them to be implemented in any runtime environment. Thus, the implementation of hierarchical structures is more dependent upon the definition of the model than the particular runtime environment or framework in which the hierarchical structure is to be implemented.

Figure 4:
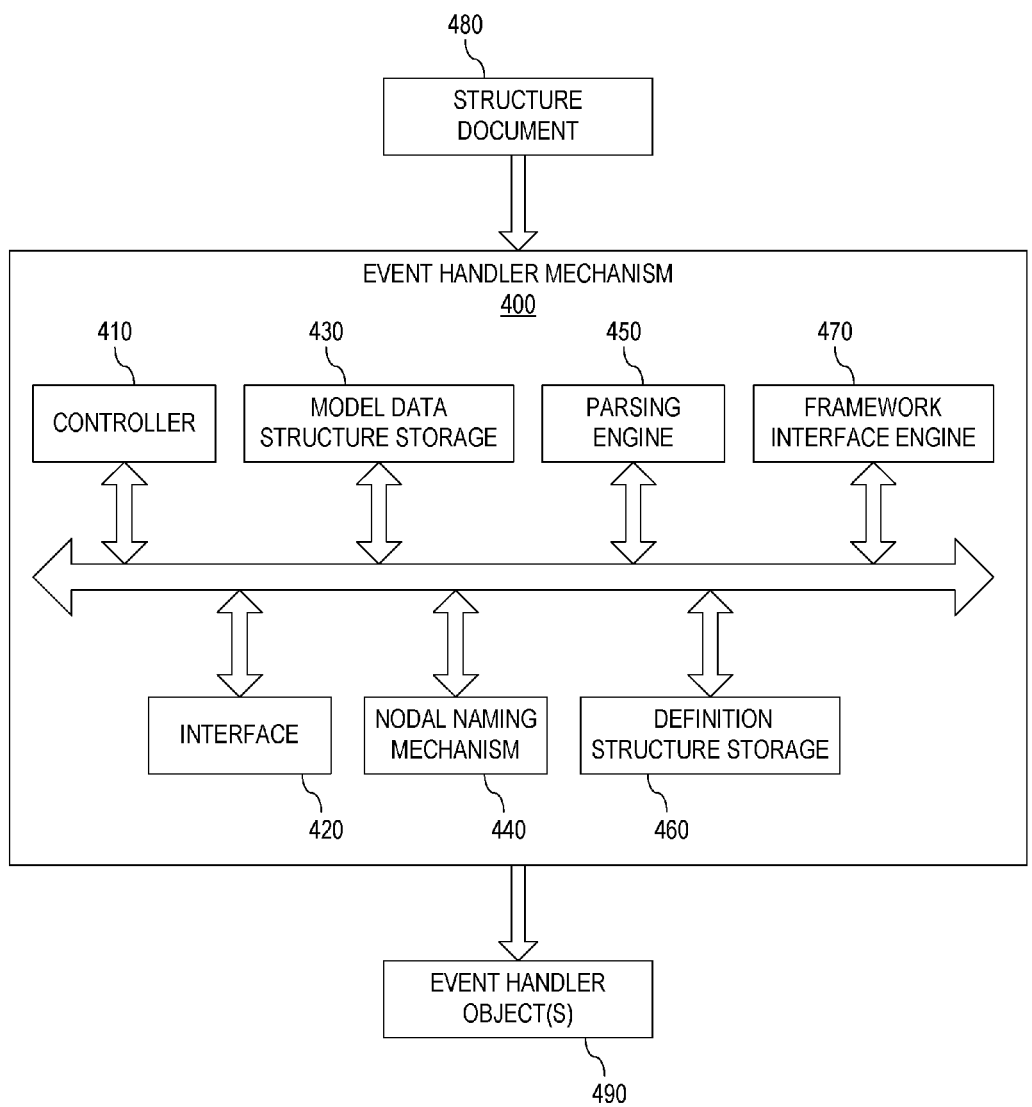
FIG. 4 is an example diagram of the primary operational components of a generic event bindings mechanism in accordance with one illustrative embodiment.

FIG. 4 is an example diagram of the primary operational components of a generic event bindings mechanism in accordance with one illustrative embodiment. The elements shown in FIG. 4 may be implemented in hardware, software, or any combination of hardware and software. For example, in one illustrative embodiment, the elements of FIG. 4 are implemented as software executed by one or more processors of one or more data processing systems.

As shown in FIG. 4, the generic event bindings mechanism comprises a controller 410, an interface 420, a model data structure storage 430, a nodal naming mechanism 440, a parsing engine 450, an event/event handler definition structure storage 460, and a runtime environment (framework) interface engine 470. The controller 410 controls the overall operation of the generic event binding mechanism and orchestrates the operation of the other elements 420-470. The interface 420 provides a communication pathway through which the event binding mechanism may communicate with other elements of a data processing system by receiving inputs and providing outputs. For example, the event binding mechanisms may receive a structured document input 480 defining event types, event handlers, and event bindings in one programming language and provide corresponding event handler objects 490 as outputs in the same or another programming language for a particular targeted runtime environment, i.e. framework, as part of a rendered hierarchical structure, e.g., GUI.

The model data structure storage 430 stores one or more model data structures defining one or more hierarchical structures using a predetermined representation. A different model may be provided for each type of runtime environment, framework, or the like, that is supported by the implementation of the mechanisms of the illustrative embodiments. For purpose of describing the illustrative embodiments herein, it will be assumed that the hierarchical structures are graphical user interfaces (GUIs) since event types, event handlers, and event bindings are typically used in the programming of GUIs. However, it should be appreciated that other types of hierarchical structures that utilize event types, event handlers, and event bindings may be used with the mechanisms of the illustrative embodiments without departing from the spirit and scope of the illustrative embodiments.

In one illustrative embodiment, the models of the hierarchical structures, e.g., GUIs, are defined in structure documents as directed acyclic graphs (DAGs) that can be represented as a set of nodes N and a set of paths between nodes P. A DAG has a set of root or start nodes R with each node in the set of nodes N providing a means by which to access its successor nodes, i.e. the nodes to which it is connected via a path P. The DAG further has a way to monitor changes in the structure of the DAG or modifications of the properties of a node N. Such DAG models are generally known in the art.

In accordance with the mechanisms of the illustrative embodiments, each node of the particular models utilizes a name that is able to be categorized or typed by the event binding mechanism using the nodal naming mechanism 440. For example, in Accessiblity Tools Framework (ACTF), available from the Eclipse Technology Project, the default node name of any object in the model is its unqualified Java class name, i.e. its name without the package. In models that represent structures that implement (or nearly implement) the W3 Consortium Document Object Model (DOM) Level 2 Core specification, the node name is a tag name of the element from which the object was rendered. In a hierarchy of accessible objects provided by a native accessibility architecture, the node name is the accessible role of the object.

The models may be provided as structured documents created using any of a number of different architectures, frameworks, or the like. The nodal naming mechanism 440 is able to determine the architecture or framework under which a model of a hierarchical structure was created and, based on a knowledge of the nodal naming convention for the particular architecture, framework, etc., extract a directed acyclic graph (DAG) representation of the hierarchical structure.

Input structure documents may be provided for defining specific hierarchical structures, such as a GUI, using any of the number of different architectures, frameworks, or the like. The input structure documents have event types and event handlers specified, such as in an "events document" which may be a portion of the input structure document or a separate input structure document, with the bindings of the event types and event handlers also being specified in a declarative manner, i.e. without reference to the underlying framework. In the defining of these event types and event handlers, and their bindings, the event types are preferably annotated with identifiers of node names and node identifiers. These annotations inform the event binding mechanism of the illustrative embodiments to associate a particular event handler as the event handler for a particular event type of a particular node having the corresponding node name and node identifier. If no node identifier is specified, then the event handler is registered as the event handler for all nodes having the corresponding node name. These annotations may be processed in accordance with a DAG of a model stored in the model data structure storage 430 to thereby generate event and event handler objects 460 corresponding to a specific hierarchical structure, e.g., GUI, and particular runtime environment, framework, or the like.

When an input structure document 480 for a specific hierarchical structure is provided to the mechanisms of the illustrative embodiments, such as via interface 420, for rendering in a particular runtime environment or framework, such as during a creation or registration process of the input structure document 480, the input structure document 480 is parsed by the parsing engine 450 and processed in accordance with a corresponding model, provided in terms of a DAG for example, in the model data structure storage 430. As mentioned above, the input structure document 480 is annotated to correlate components of the input structure document 480 with nodes of a corresponding model's DAG in the model data structure 430. The parsing identifies the events and event handlers and their bindings specified in the input structure document 480 and the event binding mechanism 400 generates corresponding event handler objects, along with their bindings, for the particular runtime environment or framework in which the input structured document 480 is being implemented.

The event/event handler definition structure storage 460 provides definitions of event types and event handlers for the various possible runtime environments, or frameworks, supported by the illustrative embodiments. These definitions may be correlated with the nodes of the models (defined as DAGs) so that a particular implementation of a hierarchical structure for the particular target runtime environment or framework is able to be generated. The runtime environment (framework) interface engine 470 is able to analyze the models and correlate them to the appropriate definitions for the target runtime environment or framework.

Thus, models may be created and stored for use in rendering specific hierarchical structures, as well as for creating, traversing, and generally interacting with hierarchical structures in particular runtime environments. The use of the models, along with a defined node naming methodology, allows annotated input structure documents to be correlated with the models to bind node events and event handlers with specific nodes of the models to thereby generate a hierarchical structure. Definitions for the nodes of the hierarchical structure, for specific runtime environments or frameworks, may be retrieved and used to generate an implementation of the hierarchical structure for the target runtime environment or framework.

Figure 5:
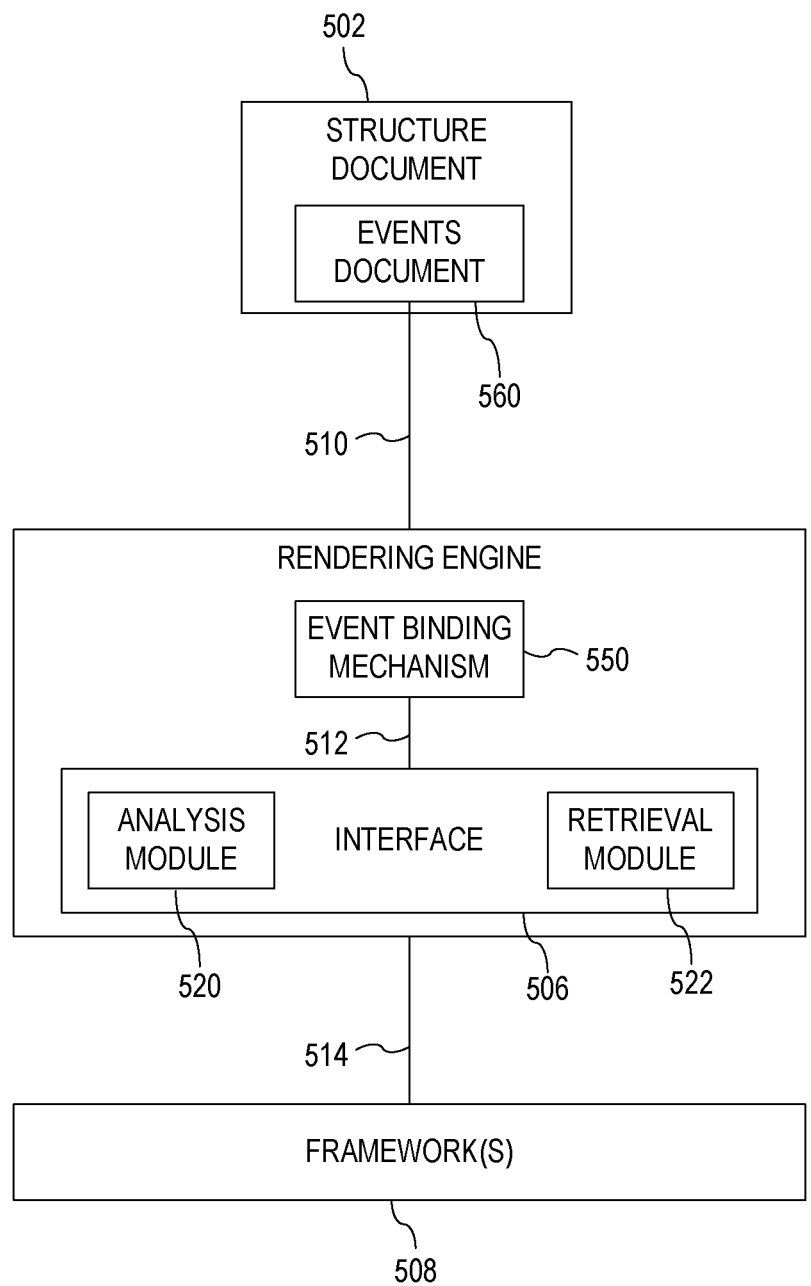
FIG. 5 is an example diagram illustrating one way in which an event binding mechanism may be implemented in a rendering engine for generating a GUI having events and event handlers, and associated bindings, in accordance with one illustrative embodiment.

The event binding mechanism 400 of FIG. 4 may be provided as part of a rendering engine for rendering hierarchical structures, such as a GUI or the like. FIG. 5 illustrates one way in which an event binding mechanism of the illustrative embodiments may be implemented in a rendering engine 504 for generating a GUI having events and event handlers, and associated bindings, in accordance with one illustrative embodiment. As shown in FIG. 5, when building and rendering a GUI, a structural document 502 is first composed. The input structure document 502 may generally define a GUI and its corresponding events and event handlers as well as their bindings. The events, event handlers, and their bindings may be specified in an events document 560 portion of the structure document 502, or as a separate events document 560. There are a variety of document types that can be utilized for specifying the structure document 502. For example, the input structure document 502 may be defined in terms of an Extended Markup Language (XML) document, a HyperText Markup Language (HTML) document, a Java code or JavaScript document, or the like. The key here, however, is that the particular programming language used to generate the structure document 502 may be generic in nature in that the ultimate runtime environment (s), or framework(s), 508 need not utilize the same programming language as the structure document 502. For example, a GUI may be defined in terms of an XML structure document 502 and, through the mechanisms of the illustrative embodiments, be built and rendered for use in XML, HTML, Java, or other types of runtime environments and frameworks 508.

The input structure document 502 is annotated, such as in the events document 560, to include node names and node identifiers in association with events specified in the input structure document 502 in accordance with a naming methodology. For example, the naming methodology may be one or more of the naming methodologies used in any of a number of different architectures or frameworks, as previously discussed above. The node names and node identifiers are provided in such a manner that they may be identified during parsing of the input structure document 502 and correlated with nodes of a generic programming language model specified as a DAG.

Once constructed, the structure document 502 is communicated to the rendering engine 504 for building and rendering the hierarchical structure defined by the structure document 502. The rendering engine 504 may be any type of rendering engine capable of parsing and rendering hierarchical structures defined in a structure document 502. One example of an engine 504 is the Reflexive User Interface Builder (RIB)™, which is available from International Business Machines Corporation of Armonk, N.Y. The rendering engine 504 begins the process of building and rendering a hierarchical structure based on the structure document 502 which is communicated to the rendering engine 504 through a first communication channel 510. The rendering engine 504 is enhanced to include the event binding mechanism 550 of the illustrative embodiments for identifying events, event handlers, and associating them with particular nodes in a generically defined DAG model of a GUI in accordance with a generic naming methodology.

While parsing the structured document 502 for components, and associating events, event handlers, and their bindings with nodes of the defined DAG model of a GUI, the rendering engine 504 may utilize an interface 506 to define classes of DAG components in a variety of frameworks 508, such as XML, HTML, SWT, Java, Java Swing™ or the like. The interface 506 may be the runtime environment interface 470 in FIG. 4, for example.

Thus, with the mechanisms of the illustrative embodiments, once a model for a GUI has been defined for a target runtime environment, framework, or the like, in accordance with the mechanisms described above, and a naming methodology for forming node names is associated with that model, the event binding mechanism of the illustrative embodiments may process an annotated input structure document such as the following:

```
<events model = "web">
  <event type = "onclick" nodeName="DIV"
  nodeID="mySpecialButton">
    <handler class="com.xyz.events.MyHandler"
    method="handleEvent"/>
  </event>
</events>
```

The parsing of this "events document," which in this example is defined for use with an HTML programming language model "web", is annotated with the nodeName and nodeID and may be part of an input structure document, may be performed by a parser of the event binding mechanism when the input structure document is created or registered for implementation with a target runtime environment or framework. In this example, the events document instructs the event binding mechanism to use the method "handleEvent" from the Java class com.xyz.events.MyHandler as the event handler for the onclick event of the node with name "DIV" and node id "mySpecialButton." If no nodeID had been specified in the above example, then the event handler would have been bound to all nodes with the name "DIV." The event binding mechanism is able to query the model in order to know how to perform the actual binding of the event handler with the event "onclick" associated with the node having a node name of "DIV" and node id of "mySpecialButton." For example, the model may be queried via an interface implementation that represents the model and may, for example, generate a button.addActionListener (myHandler) either as static Java code to be complied or, using the Java Reflection API, to be executed dynamically. In the domain of the live DOM may be modified to add the handler, e.g., div.addEventHandler("onclick").

The above is an example of an events document that is defined in terms of an HTML framework, however with the mechanisms of the illustrative embodiments, the events document may be defined using any desired programming language and for any particular framework, as long as the events document is annotated to include the node name and, optionally, the node identifier in accordance with a known node naming methodology associated with a generic programming language model. The following is an example of an events document defined using Java Swing™:

```
<events model="swing">
  <event type="pressed" nodeName="JButton">
    <handler>
      highlightButton(event.getSource( ));
      System.out.println("button pressed");
    </handler>
  </event>
</events>
```

This events document instructs the event binding mechanism to attach the given Java code as an event handler to all buttons in a Java Swing GUI to be invoked when these buttons are pressed. The event binding mechanisms and the model work together to map the "pressed" event type to the ActionListener.actionPerformed method on the javax.swing.JButton instances and to actually generate and programmatically attach this event handler to the target JButton instances. It should be noted that there is no restriction on the code that may be embedded in the <handler> element. For example, the code given in the example above may just as easily be JavaScript and not Java code.

Figure 6:
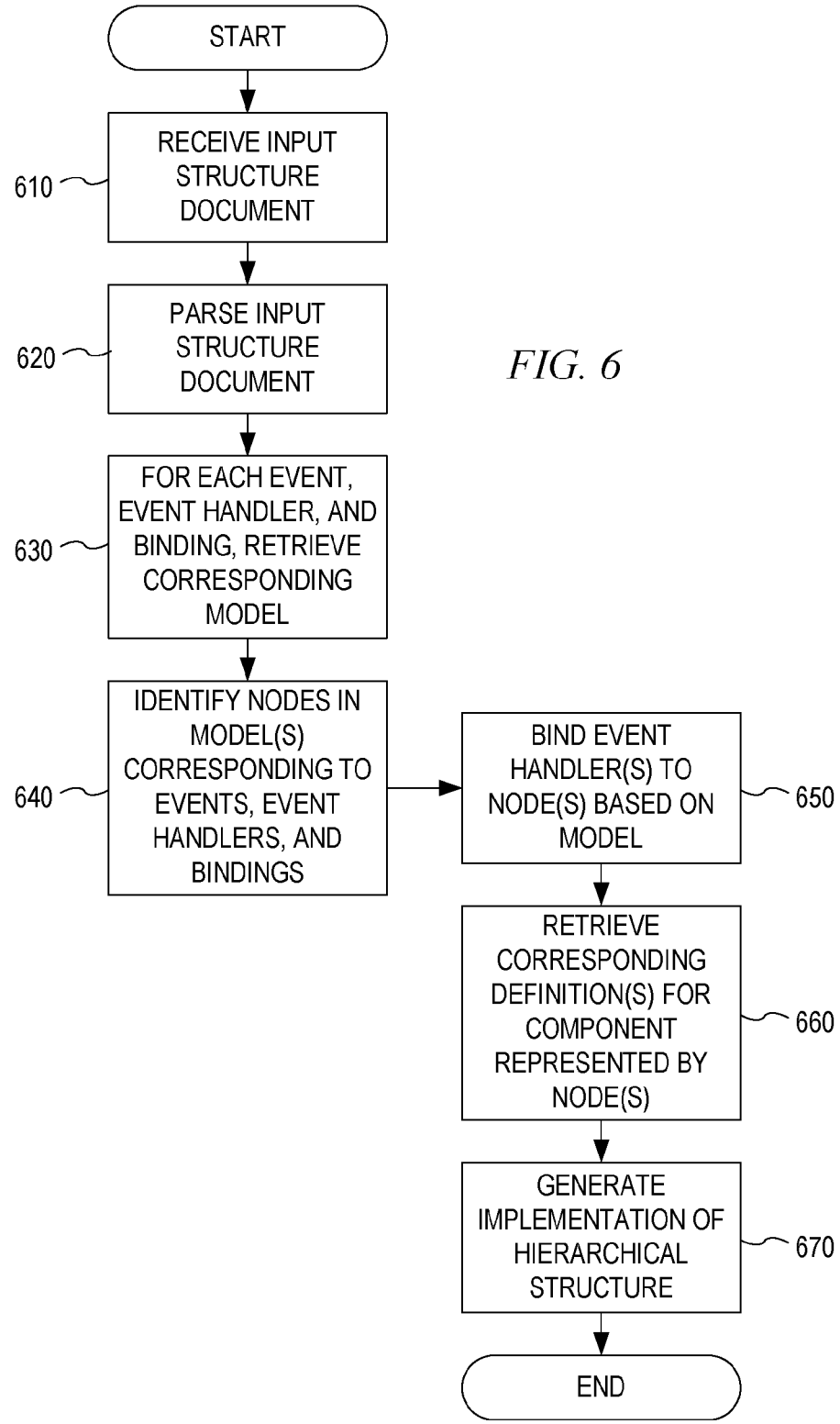
FIG. 6 is a flowchart outlining an exemplary operation for implementing event bindings for a target runtime environment or framework in accordance with one illustrative embodiment.

FIG. 6 is a flowchart outlining an exemplary operation for implementing event bindings for a target runtime environment or framework in accordance with one illustrative embodiment. As shown in FIG. 6, the operation starts by receiving an input structure document defining a hierarchical structure to be implemented in a target runtime environment or framework (step 610). As discussed above, the input structure document may specify the model to be used to generate the hierarchical structure and events, event handlers, and bindings to be used with regard to specified nodes in the model. The input structure document is parsed and components of the hierarchical structure and their corresponding events, event handlers, and bindings are identified (step 620). For each event handler and its event binding encountered during the parsing of the input structure document, a corresponding model, as specified in the event handler and event binding specification in the input structure document, is retrieved (step 630). The nodes in the model corresponding to the event handler and event binding are identified based on at least a node name and, optionally, a node id specified for the event handler and event binding (step 640). The identified event handler is bound to the identified event in association with the node in the model based on the node name and, optionally, the node id (step 650). A corresponding definition for the component represented by the node is retrieved from a component definitions data structure storage (step 660) and used to generate an implementation of the hierarchical structure in the target framework (step 670). The operation then ends.

Thus, the illustrative embodiments provide mechanisms for abstracting the definition of a hierarchical structure and its associated events, event handlers, and event bindings away from the underlying runtime environment, framework, or the like in which the hierarchical structure is to be implemented. In one illustrative embodiment, this allows GUIs to be defined using models provided for one or more runtime environments, frameworks, or the like, and a structured document referencing one of these models and using a node naming methodology that allows the events, event handlers, and event bindings to be associated with particular nodes of the models. In this way, the structure document need not reference any of the elements of the underlying runtime environment, framework, or the like. To the contrary, the implementation of the hierarchical structure in a particular runtime environment, framework, or the like, is handled by the definition of a hierarchical model, such as a directed acyclic graph, and correlating nodes of the model with definitions of components provided for the individual runtime environments, frameworks, and the like.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for binding an event handler with an event in association with a component of a hierarchical structure, comprising:
    receiving, in a processor of the data processing system, a structure document specifying an event type, an event handler, and a binding of the event handler with the event type;
    associating, by the processor, based on the structure document, the event type and event handler, specified in the structure document, with one or more nodes of a hierarchical model of the hierarchical structure stored in a storage device of the data processing system;
    binding, by the processor, the event handler with the event type for the one or more nodes in accordance with the hierarchical model based on the binding of the event handler with the event type specified in the structure document; and
    generating, by the processor, one or more objects for implementing the hierarchical structure in a framework corresponding to the hierarchical model, wherein the structure document specifies the event binding of the event handler with the event type in a declarative manner.

2. The method of claim 1, wherein the hierarchical structure is a graphical user interface.

3. The method of claim 1, wherein the hierarchical model is one of a plurality of hierarchical models with which the structure document may be utilized to generate one or more options for implementing the hierarchical structure in a plurality of frameworks, and wherein each hierarchical model is associated with a different framework.

4. The method of claim 1, wherein the event handler is defined using a first programming language and wherein the framework utilizes a second programming language different from the first programming language.

5. The method of claim 1, wherein associating the event type and event handler with one or more nodes of the hierarchical model comprises using a nodal naming mechanism that correlates node identifiers with implementations of corresponding event types, event handlers, and their bindings in a desired programming language for the framework.

6. The method of claim 5, wherein a directed acyclic graph (DAG) representation of the hierarchical structure identifies a nodal naming convention for a framework under which a model of the hierarchical structure was created, and wherein the nodal naming mechanism correlates node identifiers with implementations of corresponding event types, event handlers, and their bindings in the desired programming language for the framework based on the nodal naming convention.

7. The method of claim 1, wherein the structure document is annotated with at least one of node name identifiers or node identifiers associated with an event type, and wherein associating the event type and event handler with one or more nodes of the hierarchical model comprises using the annotations to assign the event handler as the event handler for handling events of the event type for a particular node, having the corresponding node name or node identifier, in the hierarchical model.

8. The method of claim 1, wherein, to assign the event handler to a specific individual node of the hierarchical model, the structure document is annotated with both a node name identifier and a node identifier associated with the event type, and wherein if no node identifier is specified in the annotation, the event handler bound to the event type is registered as the event handler for all nodes in the hierarchical model having the corresponding node name identifier.

9. The method of claim 3, wherein generating one or more objects for implementing the hierarchical structure in a framework corresponding to the hierarchical model comprises:
    providing definitions of event types and event handlers for the plurality of frameworks;
    associating a definition of the event type and event handler with the one or more nodes of the hierarchical model based on the framework corresponding to the hierarchical model and the definitions of event types and event handlers for that framework; and
    generating the one or more objects for implementing the hierarchical structure in the framework corresponding to the hierarchical model based on the association of the definition of the event type and event handler.

10. The method of claim 1, wherein the structure document is created using one of a first markup language or a first object oriented programming language and wherein the framework corresponding to the hierarchical model utilizes a second markup language or second object oriented programming language different from the first markup language or first object oriented programming language.

11. A computer program product comprising a non-transitory computer recordable medium having a computer readable program recorded thereon, wherein the computer readable program, when executed on a computing device, causes the computing device to:
    receive a structure document specifying an event type, an event handler, and a binding of the event handler with the event type;
    associate, based on the structure document, the event type and event handler, specified in the structure document, with one or more nodes of a hierarchical model of a hierarchical structure;

bind the event handler with the event type for the one or more nodes in accordance with the hierarchical model based on the binding of the event handler with the event type specified in the structure document; and generate one or more objects for implementing the hierarchical structure in a framework corresponding to the hierarchical model, wherein the structure document specifies the event binding of the event handler with the event type in a declarative manner.

12. The computer program product of claim 11, wherein the hierarchical structure is a graphical user interface.

13. The computer program product of claim 11, wherein the hierarchical model is one of a plurality of hierarchical models with which the structure document may be utilized to generate one or more options for implementing the hierarchical structure in a plurality of frameworks, and wherein each hierarchical model is associated with a different framework.

14. The computer program product of claim 11, wherein the event handler is defined using a first programming language and wherein the framework utilizes a second programming language different from the first programming language.

15. The computer program product of claim 11, wherein the computer readable program causes the computing device to associate the event type and event handler with one or more nodes of the hierarchical model by using a nodal naming mechanism that correlates node identifiers with implementations of corresponding event types, event handlers, and their bindings in a desired programming language for the framework.

16. The computer program product of claim 15, wherein a directed acyclic graph (DAG) representation of the hierarchical structure identifies a nodal naming convention for a framework under which a model of the hierarchical structure was created, and wherein the nodal naming mechanism correlates node identifiers with implementations of corresponding event types, event handlers, and their bindings in the desired programming language for the framework based on the nodal naming convention.

17. The computer program product of claim 11, wherein the structure document is annotated with at least one of node name identifiers or node identifiers associated with an event type, and wherein associating the event type and event handler with one or more nodes of the hierarchical model comprises using the annotations to assign the event handler as the event handler for handling events of the event type for a particular node, having the corresponding node name or node identifier, in the hierarchical model.

18. The computer program product of claim 11, wherein, to assign the event handler to a specific individual node of the hierarchical model, the structure document is annotated with both a node name identifier and a node identifier associated with the event type, and wherein if no node identifier is specified in the annotation, the event handler bound to the event type is registered as the event handler for all nodes in the hierarchical model having the corresponding node name identifier.

19. The computer program product of claim 13, wherein the computer readable program causes the computing device to generate one or more objects for implementing the hierarchical structure in a framework corresponding to the hierarchical model by:

providing definitions of event types and event handlers for the plurality of frameworks;

associating a definition of the event type and event handler with the one or more nodes of the hierarchical model based on the framework corresponding to the hierarchical model and the definitions of event types and event handlers for that framework; and generating the one or more objects for implementing the hierarchical structure in the framework corresponding to the hierarchical model based on the association of the definition of the event type and event handler.

20. An apparatus, comprising:

a processor; and a memory coupled to the processor, wherein the memory comprises instructions which, when executed by the processor, cause the processor to:

receive a structure document specifying an event type, an event handler, and a binding of the event handler with the event type;

associate, based on the structure document, the event type and event handler, specified in the structure document, with one or more nodes of a hierarchical model of a hierarchical structure;

bind the event handler with the event type for the one or more nodes in accordance with the hierarchical model based on the binding of the event handler with the event type specified in the structure document; and generate one or more objects for implementing the hierarchical structure in a framework corresponding to the hierarchical model, wherein the structure document specifies the event binding of the event handler with the event type in a declarative manner.

\* \* \* \* \*